Jan. 2, 1951 L. PRAHM 2,536,820
TWO-WAY COMMUNICATION SYSTEM
Filed Sept. 17, 1948
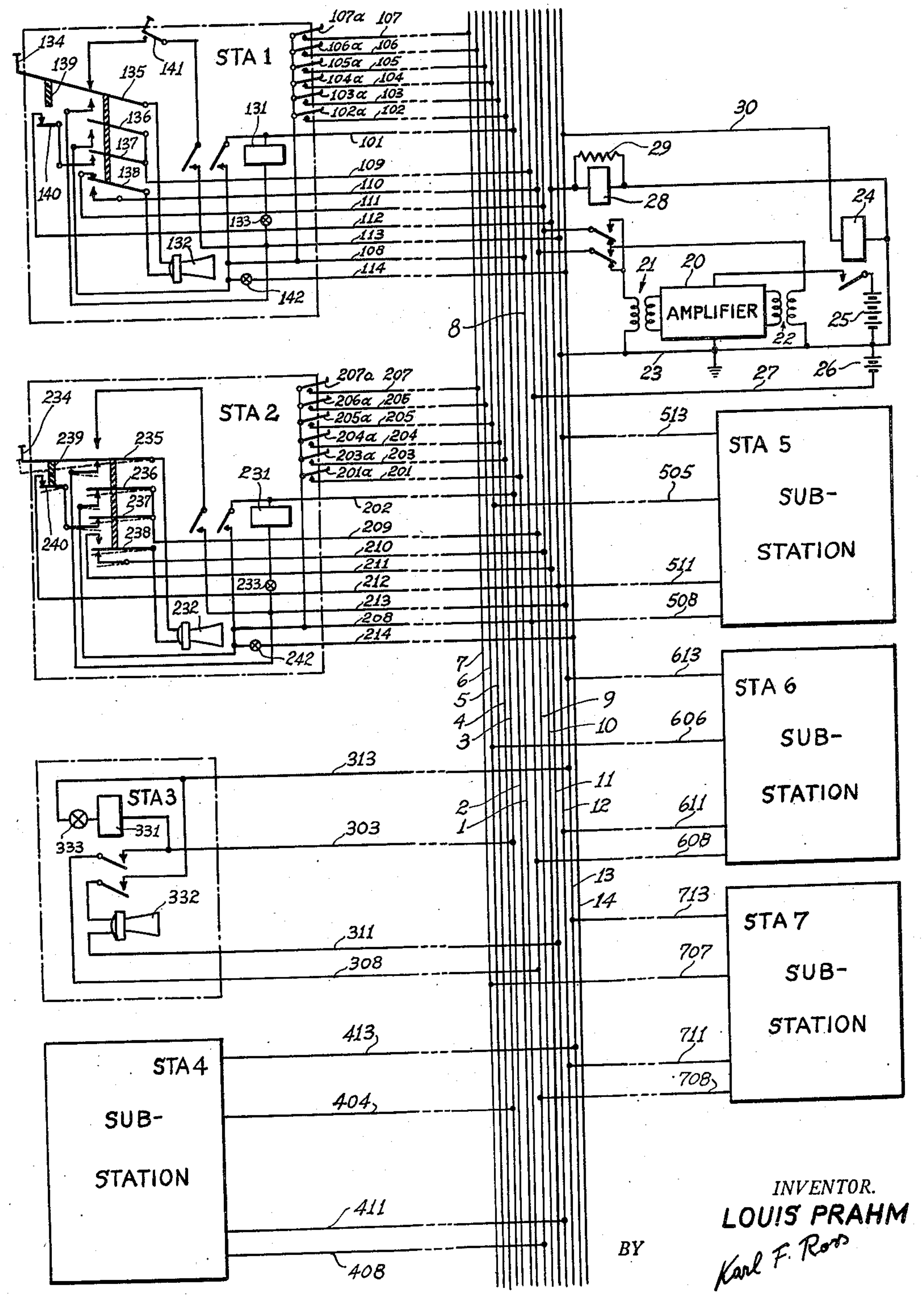
INVENTOR.
LOUIS PRAHM
BY Karl F. Ross
AGENT Patented Jan. 2, 1951 2,536,820

UNITED STATES PATENT OFFICE 2,536,820

TWO-WAY COMMUNICATION SYSTEM

Louis Prahm, New York, N. Y.

Application September 17, 1948, Serial No. 49,749

4 Claims. (Cl. 179—37)

The present invention relates to two-way communication systems of the type referred to in my co-pending application Ser. No. 37,789, filed July 9, 1948. In that application I have disclosed a system wherein a plurality of stations may selectively communicate with one another, each station being equipped with a three-position key and with means such as a dial for automatically selecting a desired station. The three-position key has one passive position and two active positions including one for receiving a message from a called station and another for directing a message to such station. By means of this key the calling party retains full control of the connection, whereas the called party need not go near the responding apparatus in order to participate in the conversation.

The general object of the present invention is to provide a simplified system of the above character, adapted particularly for installations having a small number of stations, which enables a caller at one station to communicate with a desired other station without the intermediary of an exchange, for example by actuating a push button assigned to the desired station.

Another object of the present invention is to provide a system of the character described having one or more main stations and a number of substations, each main station being adapted to call any other main station or substation while each substation is capable of responding to calls from a main station only.

The above and other objects of the invention will become apparent from the following description of a preferred embodiment, reference being had to the accompanying drawing the sole figure of which represents a system having two main stations and five substations.

The main stations are indicated at STA1 and STA2; the substations are indicated at STA3 through STA7.

As in the system disclosed in my above-identified application, there is provided in the present system an amplifier 20 common to all the stations of the system, this amplifier being provided with an input circuit shown as a transformer 21 and an output circuit shown as a transformer 22. The primary of input transformer 21 and the secondary of output transformer 22 each have one terminal grounded at conductor 23. Conductor 23 is connected to a wire 13 of a multiple comprising wires 1 through 14.

A relay 24 is adapted, when energized, to connect to the amplifier 20 its power supply, shown here as a battery 25. A second battery 26, of relatively low voltage, is connected with its positive pole to ground at conductor 23 and with its negative pole to a conductor 27 connected, in turn, to wire 9 of the multiple. A second relay 28 is connected between wires 23 and 12 and is shunted by a resistor 29, designed to act as a spark quenching means. The circuit for relay 24 is completed by a conductor 30 connected to wire 14.

The fourteen wires 101 through 114 leading to station STA1 are connected, respectively, to wires 1 through 14 of the multiple; a similar set of wires, 201 through 214, connect station STA2 to the multiple. Substation STA3 is connected to wires 8, 11 and 13, as are the other substations STA4 through STA7, as well as to wire 3; these connections lead over wires 303, 308, 311 and 313. Station STA4 is equipped with lead-in wires 408, 411, 413 and 404, the latter leading to wire 4. In analogous manner, wires 505, 508, 511 and 513 are provided for station STA5, wires 606, 608, 611 and 613 for station STA6 and wires 707, 708, 711 and 713 for station STA7.

Each station is equipped with a call relay designated 131 at station STA1, 231 at station STA2 and 331 at station STA3. Each station has also a transducer 132, 232, 332 serving both as a loudspeaker and as a microphone. An indicator lamp 133, 233, 333 is connected in series with the respective call relay.

Each main station (STA1, STA2) is also provided with a control key 134, 234 having four contact springs 135, 136, 137, 138 and 235, 236, 237 and 238. This key has three positions, the first or unoperated position being shown at station STA1 and the two operated positions at STA2 in full and dot-dash lines, respectively. Key 134, 234 is also provided with an insulated stud 139, 239 which in the third position of the key opens a contact 140, 240, respectively; this contact remains closed in the first two positions of the key.

A station may also be provided with a cut-out switch such as shown at 141 for station STA1, serving to prevent a caller (e. g. at STA2) from listening in on a conversation going on at the location of station STA1 or from transmitting a message to that station when the subscriber there desires not to be disturbed. A "busy" lamp 142, 242 is inserted in conductor 114, 214, respectively, and is effectively in series with relay 24 as will subsequently appear.

Each main station is further provided with a set of push-buttons (six in the present case) shown at 102*a* through 106*a* (STA1) and 201*a*, 203*a* through 206*a* STA2), designed to connect wire 108, 208, respectively, to corresponding wires 102 through 106 and 201, 203 through 206.

It will be understood that additional signaling means, for example a buzzer, may be connected in series or in parallel with the signal lamp 133 etc. in order to attract the attention of a party at a called station.

The operation of this system is as follows:

*Call between two main stations.*—Let us assume that a caller at station STA2 desires to talk to a party at station STA1. He depresses key 234 into the second (horizontal) position shown in full lines. Springs 235, 236, 237, 238 make their front contacts but contact 240 remains closed. Relay 24 energizes: Battery 26, wires 27, 9, 209, spring 236 and front contact thereof, lamp 242, wires 214, 14, 30, relay 24, ground. Relay 24 operates and connects power to the amplifier 20. At the same time the "busy" lamp in station STA1 lights up in parallel with lamp 242: Wires 14 and 114, lamp 142, wires 109, 8 and 208. Relay 28 operates: Battery 26, wires 27, 9, 209, spring 237 and front contact thereof, closed contact 240, wires 212 and 12, relay 28 to ground.

The caller depresses momentarily his button 201*a*, assigned to the desired station STA1. At the called station relay 131 energizes and lamp 133 lights: Battery 26, wires 27, 9, 209, spring 236 and front contact thereof, wire 208, button 201*a*, wires 201, 1, 101, relay 131, lamp 133, wires 113, 13, 23 to ground. Relay 131 operates and locks over its right-hand armature and front contact, wires 108 and 8 to wire 208, independently of push button 201*a* which may now be released.

If switch 141 is open at station STA1, nothing further will happen except that the party thereat is apprised of the fact that a caller is attempting to establish a connection; as soon as this switch is closed, a circuit is established to connect transducer 132 across the primary of input transformer 21: grounded primary terminal, wires 23, 13, 113, front contact and left-hand armature of relay 131, switch 141, back contact and spring 135 of key 134, transducer 132, spring 138 and back contact of key 134, wires 111 and 11, upper armature and front contact of relay 28, ungrounded primary terminal. An oral response by the called party will now be heard by the caller at station STA2 where the transducer 232 is connected across the secondary of output transformer 22: Grounded secondary terminal, wires 23, 13, 213, front contact and spring 235 of key 234, transducer 232, spring 238 and front contact of key 234, wires 210 and 10, lower armature and front contact of relay 28, ungrounded secondary terminal.

When the caller desires to transmit a message to the called station, he depresses key 234 into its third position, thereby opening contact 240. Relay 28 releases and reverses the connections to the amplifier, so that the primary of transformer 21 is now connected across the transducer 232 while the secondary of transformer 22 is connected across transducer 132. By manipulating his key 234 between the two positions indicated, the caller will be able selectively to transmit and receive messages to and from the called station STA1.

When the conversation has ended the caller releases key 234 which rises to its normal or inactive position; all relays release, and the circuits return to normal.

*Call to substation.*—Let us assume that the caller desires to converse with a party at station STA3. After the key 234 has been brought into horizontal position, leading to the energization of relays 24 and 28 as previously described, the caller depresses push button 203*a* which is the one assigned to substation STA3. Relay 331 energizes in series with lamp 333: Battery 26, wires 27, 9, 209, spring 236 and front contact thereof, wire 208, button 203*a*, wires 203, 3, 303, relay 331, lamp 333, wires 313, 13, 23 to ground. Relay 331 attracts its armatures and connects transducer 332 across the primary of input transformer 21: Grounded primary terminal, wires 23, 13, 313, front contact and lower armature of relay 331, transducer 332, wires 311 and 11, upper armature and front contact of relay 28, ungrounded primary terminal. When the key 234 is fully depressed, relay 28 will again reverse the connections and connect transducer 332 across the secondary of output transformer 22.

In completely analogous manner, actuation of any other button on station STA2 will connect that station with a selected one of substations STA4 through STA7 and similar connections may be established from station STA1. It will be understood that the number of main and substations may be different from that shown in the drawing, although, for practical considerations, I prefer to limit a system according to the invention to a maximum of eight stations. The connections necessary between the multiple and each main station (wires 101 through 114, for example) may then be effected by means of two multicore cables, whereas in the case of each substation a single such cable will suffice.

Although the invention has been described with reference to a single, preferred embodiment, it is to be understood that the same is susceptible to numerous adaptations and modifications without departing from its spirit and scope as defined in the objects and in the appended claims.

I claim:

1. In a communication system comprising a number of stations including a plurality of control stations each adapted to call any other of said stations, in combination, an amplifier common to all of said stations, said amplifier having an input and an output circuit, a first and a second communication channel common to all of said stations, and call control means at each of said control stations comprising a key having a normal position and two off-normal positions including a listening and a talking position, first contact means closed in the off-normal positions of said key for connecting the respective control station to said first channel, second contact means closed in the normal position of said key for selectively connecting said respective control station to said second channel, selector means for connecting any one of the remaining stations to said first channel, and switch-over means controlled by said key for connecting said input and output circuits to said first and second channels, respectively, in one of said off-normal positions and to said second and first channels, respectively, in the other of said off-normal positions.

2. The combination according to claim 1 wherein said switch-over means comprises a relay common to all of said control stations, said relay having a plurality of energizing circuits each adapted to be closed by a respective one of said keys.

3. The combination according to claim 2 wherein said energizing circuits are closed in the listening positions of the respective keys.

4. The combination according to claim 1 wherein at least one of said control stations is provided with circuit breaker means operable at the will of a party thereat for disconnecting said control station from said second channel.

LOUIS PRAHM.

REFERENCES CITED

The following references are of record in the file of this patent:

UNITED STATES PATENTS

| Number | Name | Date |
|---|---|---|
| 2,162,369 | Campbell | June 13, 1939 |
| 2,249,456 | Campbell | July 15, 1941 |
| 2,269,144 | Campbell | Jan. 6, 1942 |
| 2,317,358 | Campbell | Apr. 27, 1943 |
| 2,339,678 | Campbell | Jan. 18, 1944 |
| 2,347,079 | Campbell | Apr. 8, 1944 |